![United States Patent Office] 3,121,094
Patented Feb. 11, 1964

3,121,094
DIOXOLANE CARBAMATES
Bruce W. Horrom, Waukegan, and Harold E. Zaugg, Lake Forest, Ill., assignors to Abbott Laboratories, North Chicago, Ill., a corporation of Illinois
No Drawing. Filed Oct. 21, 1958, Ser. No. 768,541
11 Claims. (Cl. 260—340.9)

This invention relates to novel substituted dioxolane carbamates of the type represented by the following structures:

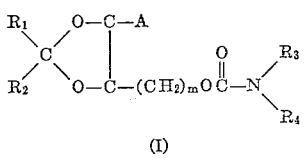
(I)

where $R_1$ and $R_2$ are loweralkyl, cycloalkyl or phenyl; $m$ is an integer of 1 or 2; A is hydrogen, loweralkyl or carbamoxy-loweralkyl; $R_3$ and $R_4$ are hydrogen or loweralkyl; $R_1$ and $R_2$ together with the adjacent carbon atom form a cycloalkyl spiro; and

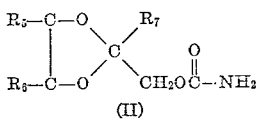
(II)

where $R_5$ and $R_7$ are loweralkyl and $R_6$ is hydrogen or lower alkyl. The invention also relates to a method of preparing the foregoing novel compounds.

The foregoing novel substituted dioxolane carbamates are prepared by successively reacting phosgene and ammonia or a diloweralkylamine with 1,3-dioxolanes represented by the following structures:

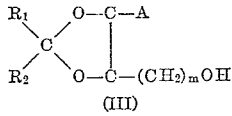
(III)

where A is hydrogen, loweralkyl or loweralkylhydroxy; $R_1$ and $R_2$ have the same significance as in Structure I; and

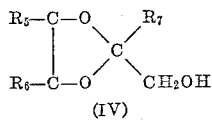
(IV)

where $R_5$, $R_6$ and $R_7$ have the same significance as in Structure II.

The foregoing substituted dioxolanes are reacted with at least a stoichiometric amount of phosgene in an organic solvent to which is added an acid acceptor reagent chosen from among pyridine, collidine, tertiary alkyl amines such as triethylamine, triisopropyl amine and the like; and inorganic salt acceptors such as sodium carbonate, sodium bicarbonate, sodium hydroxide and the like. During the addition of an acid acceptor and a substituted dioxolane to phosgene, the reaction temperature is preferably maintained between 4° and 12° C. Upon completing the foregoing addition, the reaction mixture is stirred at or about room temperature. Thereafter, a suitable solvent is added and the amine hydrochloride or sodium chloride of reaction is removed by filtration. To the filtrate is then added ammonia or a diloweralkylamine and the dioxolane carbamate product is separated as a solid or as a water-immiscible liquid.

The 1,3-dioxolanes employed as starting materials may be prepared by the procedure outlined in JACS, volume 71, page 3304 (1949).

The dioxolane carbamates obtained by the teachings of this invention are useful as muscle relaxants and as tranquilizers. The term "muscle relaxants" particularly refers to compounds having a pharmacological effect on the central nervous system which relieves skeletal muscle tension without affecting alertness. The tranquilizing utility relates to that pharmacodynamic property which is exemplified by a decrease, in animals, of aggressiveness and viciousness.

The following examples are presented to illustrate the preparation of the novel compounds of this invention. Such examples are not to be construed as an exclusive embodiment.

EXAMPLE I 2-(n)-Amyl-2-Methyl-4-Carbamoxymethyl-1,3-Dioxolane

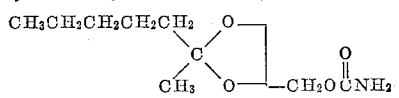

A solution of 20 grams (0.2 mole) of phosgene in 200 cc. of dry toluene is cooled to 4° C. To this solution is added dropwise with stirring 20.5 grams (0.2 mole) of triethylamine and 37.64 grams (0.2 mole) of 2-methyl-2-(n)-amyl-1,3-dioxolane in 100 cc. of dry chloroform. The addition is carried out at a temperature of from 4° to 12° C. After the addition is completed, the mixture is stirred at room temperature for about 12 hours. Upon completion of the reaction, ether is added to the reaction mixture which is thereafter filtered to remove the triethylamine hydrochloride of reaction. The filtrate is made basic with ammonia and refiltered to separate the ammonium chloride of reaction. The resulting filtrate is concentrated and fractionally distilled under reduced pressure to obtain 37.5 grams (82%) of 2-(n)-amyl-2-methyl-4-carbamoxymethyl-1,3-dioxolane which boils at 147° C. (0.48 mm.). On standing, the oil solidifies and after recrystallization from pentane the product melts at 42°–44° C.

Analysis.—Calcd. for $C_{11}H_{21}NO_4$: C, 57.11%; H, 9.14%; N, 6.05%. Found: C, 57.11%; H, 9.24%; N, 5.97%.

By following the procedure of Example I with different starting dioxolanes, the following compounds are prepared and identified.

EXAMPLE II 2,2-Dicyclobutyl-4-Carbamoxymethyl-1,3-Dioxolane

The dioxolane employed is 2,2-dicyclobutyl-4-hydroxymethyl-1,3-dioxolane.

The product is obtained in a yield of 67% as an oil, B.P. 156°–166° C. (0.7 mm.). Upon standing, the oil solidifies and is recrystallized from a mixture of hexane isomers (Skelly Solvent B), M.P. 91°–92° C.

Analysis.—Calcd. for $C_{13}H_{21}NO_4$: C, 61.15%; H, 8.29%; N, 5.48%. Found: C, 61.26%; H, 8.34%; N, 5.61%.

EXAMPLE III 2,2-Diphenyl-4-Carbamoxymethyl-1,3-Dioxolane

The dioxolane employed in the process is 2,2-diphenyl-4-hydroxymethyl dioxolane.

The product is obtained in a yield of 54% as an oil. Upon standing, the oil solidifies and is recrystallized from a benzene-pentane mixture, M.P. 94°–95° C.

Analysis.—Calcd. for $C_{17}H_{17}NO_4$: C, 68.21%; H, 5.73%; N, 4.68%; O, 21.38%. Found: C, 69.03%; H, 6.09%; N, 4.57%; O, 20.98%.

EXAMPLE IV

*2,2-Di-(Iso)-Propyl-4-Carbamoxymethyl-1,3-Dioxolane*

The dioxolane employed in the process is 2,2-di-(iso)-propyl-4-hydroxymethyl-1,3-dioxolane.

The product is obtained in a yield of 83% as an oil. Upon standing, the oil solidifies and is recrystallized from alcohol, M.P. 120°–121° C.

Analysis.—Calcd. for $C_{17}H_{21}NO_4$: C, 57.12%; H, 9.15%; N, 6.06%; O, 27.67%. Found: C, 57.12%; H, 9.46%; N, 6.10%; O, 28.15%.

EXAMPLE V

*2,2-Dimethyl-4-Carbamoxymethyl-1,3-Dioxolane*

The dioxolane employed in the process is 2,2-dimethyl-4-hydroxymethyl-1,3-dioxolane.

The product is obtained in a yield of 69% as an oil, B.P. 113°–114° C. (0.25 mm.). Upon standing, the oil solidifies and is recrystallized from benzene, M.P. 68°–69° C.

Analysis.—Calcd. for $C_7H_{13}NO_4$: C, 47.99%; H, 7.48%; N, 8.00%; O, 36.53%. Found: C, 47.81%; H, 7.61%; N, 7.87%; O, 36.22%.

EXAMPLE VI

*2-Methyl-2-(n)-Propyl-4-Carbamoxymethyl-1,3-Dioxolane*

The dioxolane employed in the process is 2-methyl-2-(n)-propyl-4-hydroxymethyl-1,3-dioxolane.

The product is obtained in a yield of 85% as an oil, B.P. 129°–131° C. (0.3 mm.). Upon standing, the oil solidifies, M.P. 51°–53° C.

Analysis.—Calcd. for $C_9H_{17}NO_4$: C, 53.19%; H, 8.43%; N, 6.89%; O, 31.49%. Found: C, 53.39%; H, 8.56%; N, 6.73%; O, 31.68%.

EXAMPLE VII

*2-Methyl-2-(Iso)-Propyl-4-Carbamoxymethyl-1,3-Dioxolane*

The dioxolane employed in the process is 2-methyl-2-(iso)-propyl-4-hydroxymethyl-1,3-dioxolane.

The product is obtained in a yield of 72% as an oil, B.P. 130°–133° C. (0.4 mm.). Upon standing, the oil solidifies, M.P. 73°–75° C.

Analysis.—Calcd. for $C_9H_{17}NO_4$: C, 53.19%; H, 8.43%; N, 6.89%; O, 31.49%. Found: C, 52.58%; H, 8.35%; N, 6.72%; O, 32.10%.

EXAMPLE VIII

*2,2-Di-(n)-Propyl-4-Carbamoxymethyl-1,3-Dioxolane*

The dioxolane employed in the process is 2,2-di-(n)-propyl-4-hydroxymethyl-1,3-dioxolane.

The product is obtained in a yield of 82.5% as an oil, B.P. 144° C. (0.4 mm.). Upon standing, the oil solidifies, M.P. 56°–57° C.

Analysis.—Calcd. for $C_{11}H_{21}NO_4$: C, 57.12%; H, 9.15%; N, 6.06%; O, 27.67%. Found: C, 57.01%; H, 8.93%; N, 5.98%; O, 27.83%.

EXAMPLE IX

*2-Methyl-2-(t)-Butyl-4-Carbamoxymethyl-1,3-Dioxolane*

The dioxolane employed in the example is 2-methyl-2-(t)-butyl-4-hydroxymethyl-1,3-dioxolane.

The product is obtained in a yield of 98% as a solid and is recrystallized from a benzene-pentane mixture, M.P. 128°–130° C.

Analysis.—Calcd. for $C_{10}H_{19}NO_4$: C, 55.28%; H, 8.82%; N, 6.45%; O, 29.46%. Found: C, 55.28%; H, 8.92%; N, 6.72%; O, 29.80%.

EXAMPLE X

*2-Methyl-2-Phenyl-4-Carbamoxymethyl-1,3-Dioxolane*

The dioxolane reactant is 2-methyl-2-phenyl-4-hydroxymethyl-1,3-dioxolane.

The product is obtained in a yield of 77% as an oil, B.P. 153–154° C. (0.28 mm.). Upon standing, the oil solidifies and is recrystallized from a benzene-pentane mixture, M.P. 90°–91° C.

Analysis.—Calcd. for $C_{12}H_{15}NO_4$: C, 60.75%; H, 6.37%; N, 5.90%; O, 26.98%. Found: C, 59.77%; H, 6.46%; N, 6.16%; O, 27.71%.

EXAMPLE XI

*2-Methyl-2-Ethyl-4-Carbamoxymethyl-1,3-Dioxolane*

The dioxolane reactant is 2-methyl-2-ethyl-4-hydroxymethyl-1,3-dioxolane.

The product is obtained in a yield of 77% as an oil, B.P. 123° C. (0.3 mm.). Upon standing, the oil solidifies and is recrystallized from a benzene-pentane mixture, M.P. 70°–71° C.

Analysis.—Calcd. for $C_8H_{15}NO_4$: C, 50.78%; H, 7.99%; N, 7.40%; O, 33.82%. Found: C, 50.75%; H, 7.97%; N, 7.24%; O, 34.05%.

EXAMPLE XII

*2-Methyl-2-Cyclobutyl-4-Carbamoxymethyl-1,3-Dioxolane*

The dioxolane reactant is 2-methyl-2-cyclobutyl-4-hydroxymethyl-1,3-dioxolane.

The product is obtained in a yield of 82% as an oil. Upon standing, the oil solidifies and is recrystallized from a benzene-pentane mixture, M.P. 69°–70° C.

Analysis.—Calcd. for $C_{10}H_{17}NO_4$: C, 55.80%; H, 7.96%; N, 6.51%; O, 29.73%. Found: C, 55.80%; H, 7.95%; N, 6.69%; O, 29.76%.

EXAMPLE XIII

*2-Methyl-2-(n)-Amyl-4-Carbamoxyethyl-1,3-Dioxolane*

The dioxolane reactant is 2-methyl-2-(n)-amyl-4-hydroxyethyl-1,3-dioxolane.

The product is obtained in a yield of 84% as an oil, B.P. 141° C. (0.28 mm.). Upon standing, the oil solidifies.

Analysis.—Calcd. for $C_{12}H_{23}NO_4$: C, 58.75%; H, 9.45%; N, 5.71%; O, 26.09%. Found: C, 58.72%; H, 9.34%; N, 5.60%; O, 26.22%.

EXAMPLE XIV

*2-Cyclopropyl-2-Methyl-4-Carbamoxymethyl-1,3-Dioxolane*

The dioxolane reactant is 2-cyclopropyl-2-methyl-4-hydroxymethyl-1,3-dioxolane.

The product is obtained in a yield of 51% as a solid. The product is recrystallized from ether, M.P. 82°–84° C.

Analysis.—Calcd. for $C_9H_{15}NO_4$: C, 53.72%; H, 7.51%; N, 6.96%; O, 31.81%. Found: C, 52.35%; H, 7.43%; N, 7.11%; O, 33.29%.

EXAMPLE XV

*2-Methyl-2-Carbamoxymethyl-5-(n)-Amyl-1,3-Dioxolane*

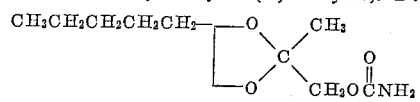

The dioxolane reactant is 2-methyl-2-hydroxymethyl-5-(n)-amyl-1,3-dioxolane.

The product is obtained in a yield of 84% as an oil, B.P. 133° C. (0.15 mm.), $n_D^{25}$ 1.4561. Upon standing, the oil solidifies, M.P. 48°–50° C.

Analysis.—Calcd. For $C_{11}H_{21}NO_4$: C, 57.12%; H, 9.15%; N, 6.06%. Found: C, 57.15%; H, 9.17%; N, 6.03%.

EXAMPLE XVI

2-Methyl-2-Carbamoxymethyl-4-Methyl-5-(n)-Amyl-1,3-Dioxolane

The dioxolane reactant is 2-methyl-2-hydroxymethyl-4-methyl-5-(n)-amyl-1,3-dioxolane.

The product is obtained in a yield of 75% as an oil, B.P. 131° C. (0.4 mm.), $n_D^{25}$ 1.4540.

Analysis.—Calcd. For $C_{12}H_{23}NO_4$: C, 58.75%; H, 9.45%; N, 5.71%. Found: C, 59.01%; H, 9.77%; N, 5.59%.

EXAMPLE XVII

2-Methyl-2-(n)-Amyl-4-Dimethylcarbamoxymethyl-1,3-Dioxolane

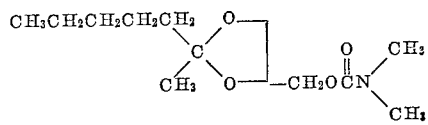

A solution of 20 grams (0.2 mole) of phosgene in 200 cc. of dry toluene is cooled to 4° C. To this solution is added dropwise with stirring 20.5 grams (0.2 mole) of triethylamine and 37.64 grams (0.2 mole) of 2-methyl-2-(n)-amyl-4-hydroxymethyl-1,3-dioxolane in 100 cc. of dry chloroform. The temperature during addition is not allowed to rise above 12° C. Following the addition, the mixture is stirred at room temperature for about 12 hours. After the reaction is completed, ether is added to the mixture which is thereafter filtered to remove the triethylamine hydrochloride. The filtrate is made basic by gassing with dimethylamine and is re-filtered to separate the dimethylamine hydrochloride of reaction. The resulting mixture is concentrated and fractionally distilled under reduced pressure to obtain 2-methyl-2-(n)-amyl-4-dimethylcarbamoxymethyl-1,3-dioxolane in a yield of 83% as an oil, B.P. 119° C. (.15 mm.), $n_D^{25}$ 1.4483.

Analysis.—Calcd. For $C_{13}H_{25}NO_4$: C, 60.20%; H, 9.72%; N, 5.40%; O, 24.68%. Found: C, 59.70%; H, 9.61%; N, 5.37%; O, 25.10%.

EXAMPLE XVIII

2-Methyl-2-(n)-Amyl-4,5-Dicarbamoxymethyl-1,3-Dioxolane

The dioxolane reactant is 2-methyl-2-(n)-amyl-4,5-dihydroxymethyl-1,3-dioxolane.

The product is obtained in a yield of 21% as a solid. The product is recrystallized from dilute alcohol, M.P. 149°–150° C.

Analysis.—Calcd. For $C_{13}H_{24}N_2O_6$: C, 51.30%; H, 7.90%; N, 9.21%; O, 31.54%. Found: C, 51.35%; H, 8.15%; N, 9.26%; O, 31.37%.

EXAMPLE XIX

2-Carbamoxymethyl-6-Methyl-1,4-Dioxaspiro-(4,5)-Decane

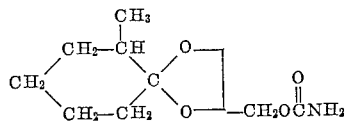

The dioxolane employed in the process is 2-hydroxymethyl-6-methyl-1,4-dioxaspiro-(4,5)-decane.

The product is obtained in a yield of 90% as an oil. Upon standing, the oil solidifies and is recrystallized from dilute alcohol, M.P. 97°–98° C.

Analysis.—Calcd. For $C_{11}H_{19}NO_4$: C, 57.62%; H, 8.35%; N, 6.11%; O, 27.91%. Found: C, 57.41%; H, 8.43%; N, 6.24%; O, 28.29%.

We claim:
1. A compound of the formula:

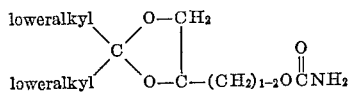

2. A compound of the formula:

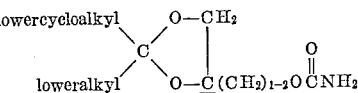

3. A compound of the formula:

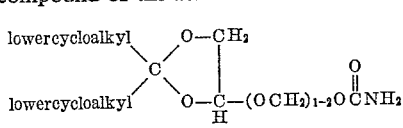

4. A compound of the formula:

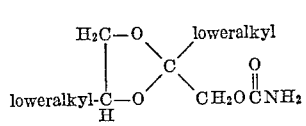

5. 2-(n)-amyl-2-methyl-4-carbamoxymethyl-1,3-dioxolane.
6. 2-methyl-2-(n)-propyl-4-carbamoxymethyl-1,3-dioxolane.
7. 2-methyl-2-(t)-butyl-4-carbamoxymethyl-1,3-dioxolane.
8. 2-methyl-2-cyclobutyl-4-carbamoxymethyl-1,3-dioxolane.
9. A substituted dioxolane carbamate selected from the group consisting of a compound of the formula:

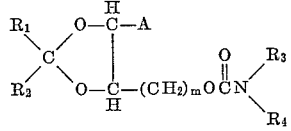

where $R_1$ and $R_2$ are selected from the group consisting of loweralkyl, lowercycloalkyl and phenyl; m is an integer of 1–2 inclusive; A is selected from the group consisting of hydrogen, loweralkyl and $-CH_2OCONH_2$; $R_3$ and $R_4$ are selected from the group consisting of hydrogen and loweralkyl; and a compound of the formula:

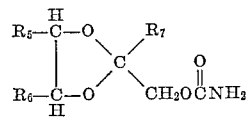

where $R_5$ and $R_7$ are loweralkyl and $R_6$ is selected from the group consisting of hydrogen and loweralkyl; and a compound of the formula:

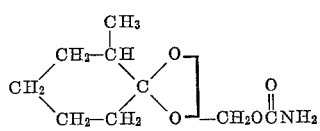

10. Compounds of the formula:

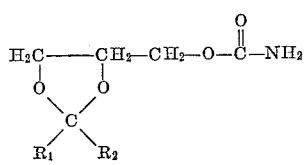

wherein $R_1$ and $R_2$ are lower alkyl.

11. Compounds of the formula

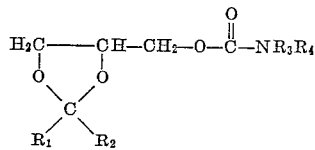

wherein $R_1$ and $R_2$ are lower alkyl and $R_3$ and $R_4$ are selected from the group consisting of hydrogen and lower alkyl.

References Cited in the file of this patent

UNITED STATES PATENTS 2,589,296    Schroeder _____ June 2, 1958

OTHER REFERENCES

Yoder et al.: J. Am. Chem. Soc., volume 45 (1923), pages 475–9.

Berger et al.: Science, volume 108, July-December (1948), pages 561–2.

Boekelheide et al.: J. Am. Chem. Soc., volume 71 (1949), pages 3303–7.